(12) United States Patent
Clack

(10) Patent No.: US 7,798,133 B2
(45) Date of Patent: Sep. 21, 2010

(54) APPARATUS FOR IMPROVING EFFICIENCY AND EMISSIONS OF COMBUSTION

(75) Inventor: David M. Clack, Quenomo, KS (US)

(73) Assignee: Clack Technologies LLC, Quenomo, KS (US)

( * ) Notice: Subject to any disclaimer, the term of this patent is extended or adjusted under 35 U.S.C. 154(b) by 386 days.

(21) Appl. No.: 11/972,801

(22) Filed: Jan. 11, 2008

(65) Prior Publication Data

US 2008/0105239 A1    May 8, 2008

Related U.S. Application Data

(63) Continuation-in-part of application No. 11/182,546, filed on Jul. 15, 2005, now Pat. No. 7,341,049.

(51) Int. Cl.
*F02M 27/00* (2006.01)
(52) U.S. Cl. ..................................................... 123/539
(58) Field of Classification Search .......... 123/536–539
See application file for complete search history.

(56) References Cited

U.S. PATENT DOCUMENTS

| | | | | |
|---|---|---|---|---|
| 1,873,746 A | * | 8/1932 | English | 123/539 |
| 4,308,844 A | * | 1/1982 | Persinger | 123/539 |
| 4,519,357 A | * | 5/1985 | McAllister | 123/539 |
| 5,010,869 A | * | 4/1991 | Lee | 123/539 |
| 7,341,049 B2 | * | 3/2008 | Clack | 123/539 |
| 2005/0126550 A1 | * | 6/2005 | Varasundharosoth et al. | 123/539 |
| 2009/0095266 A1 | * | 4/2009 | Burmenko | 123/537 |

* cited by examiner

*Primary Examiner*—M. McMahon
(74) *Attorney, Agent, or Firm*—Martin & Associates, LLC; Bret J. Petersen

(57) ABSTRACT

An apparatus improves the efficiency and emissions of a combustion process by producing sufficient amounts of ozone in the air flow to the combustion chamber to enable more complete and cleaner combustion of the fuel. The apparatus may include a plurality of cell elements disposed within a housing that is in placed in the air intake to a combustion chamber such as a diesel engine. The cell elements create an electrical plasma field that produces ozone. The apparatus may also include a scrubber in the housing to cause the air flow to have a vortex action to increase the amount of ozone that flows into the combustion chamber.

20 Claims, 6 Drawing Sheets

APPARATUS FOR IMPROVING EFFICIENCY AND EMISSIONS OF COMBUSTION

CROSS-REFERENCE TO PARENT APPLICATION

This patent application is a continuation-in-part of U.S. Ser. No. 11/182,546 by the same inventor and having the same title, which was filed Jul. 15, 2005, and which is incorporated herein by reference.

BACKGROUND

1. Technical Field

The disclosure and claims herein generally relates to combustion processes, and more specifically relates to an apparatus for improving the efficiency and emissions of a combustion process such as an internal combustion engine.

2. Background Art

It has been observed that automobiles run better after a thunderstorm. It is believed that this phenomenon is primarily caused by the natural conditions that exist after an electrical storm, namely, the presence of ozone and an increase in the relative amount of negative ions in the air. These conditions increase the efficiency of the internal combustion process by increasing the density of the air charge or the quantity of air supplied to the cylinder during a single cycle and increasing the ozone which contains more oxygen than diatomic oxygen. The combination of a denser air charge and more oxygen increases the cylinder pressure, which increases the engine torque and horsepower output. By increasing the engine's ability to do work, less fuel is used to perform the same work as an engine in a normal situation.

The conditions observed after a thunderstorm last for only a short period of time because the concentration of ozone following a thunderstorm is very small (about 1 part per billion (ppb)), and the relative imbalance of negative ions quickly reverts back to the usual positive/negative ion ratio at the earth's surface. For a short time after a thunderstorm, however, engines run more efficiently and use less gasoline.

Introduction of ozone into a combustion chamber like the conditions after a thunderstorm have been attempted to increase the efficiency of the combustion by increasing the amount of oxygen into the combustion for a given volume of air. Devices to add ozone gas and charged ions to a combustion mixture in an internal combustion engine have been described in the prior art. For example, in U.S. Pat. No. 1,982,484 issued to Runge, a distributor of an internal combustion engine is utilized to produce ozone gas which is then added to the combustion mixture flowing through an intake manifold of the engine. U.S. Pat. No. 4,308,844 to Persinger also describes improving the efficiency in an internal combustion engine by providing an ozone generator cell in the air supply to an engine. The ozone generator cell is a single tubular anode inside a tubular cathode that ionizes a relatively small volume of air to the engine.

FIG. 1 shows a prior art ozone generator used to enhance the efficiency of combustion. In FIG. 1, an ozone cell 110 is suitably disposed between the air intake 120 and a combustion chamber 130 to produce ozone and induce a charge in the air supply. In some prior art ozone generators, the ozone cell incorporates a single flat plate for the cathode and a single flat plate for the anode, and in others, the ozone cell is a single tubular anode and a single tubular cathode. The tubular cells were also shown to be placed with other tubular cells in series. An electric source is applied between the anode and cathode of the ozone cells. The electric source on the anode and cathode creates an electric field that splits oxygen molecules in the ambient air, leaving two single, highly active atoms of oxygen that combine with other oxygen to produce ozone ($O_3$). Ozone provides 50% more oxygen in its molecule, thereby providing faster and complete combustion, thereby providing more power to an engine.

While the foregoing devices to some extent may have accomplished their intended objectives, there is still a need to provide further improvement to the efficiency of an internal combustion engine. In particular, the prior art devices have not produced a sufficient volume of ozone ($O_3$) to be effective. Without a way to improve combustion, the industry will continue to suffer from inefficiency and poor engine performance.

BRIEF SUMMARY

An apparatus is described to improve the efficiency and emissions of a combustion process by producing sufficient amounts of ozone in the air flow to the combustion chamber to enable more complete and cleaner combustion of the fuel. A plurality of cell elements are disposed within a housing that is placed in the air intake to a combustion chamber such as a diesel engine. The plurality of cell elements create an electrical plasma field that produces ozone.

The apparatus may include a low frequency, lower voltage drive to the electrodes of the ozone elements. The lower frequency and voltage keep the ozone elements within a few degrees above ambient air temperature which produces a productive corona or plasma field for increased ozone available to the combustion chamber compared to prior art ozone generator cells.

The apparatus may include one or more scrubbers in the housing to cause the air flow to have a vortex action to increase the amount of ozone that flows into the combustion chamber.

The foregoing and other features and advantages of the invention will be apparent from the following more particular description and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to an apparatus to improve the efficiency and emissions of a combustion process by producing sufficient amounts of ozone in the air flow to the combustion chamber to provide more complete and cleaner combustion of the fuel. In a preferred implementation, a plurality of cell elements are disposed within a housing that is in placed in the air intake to a combustion chamber such as a diesel engine.

Figure 1:
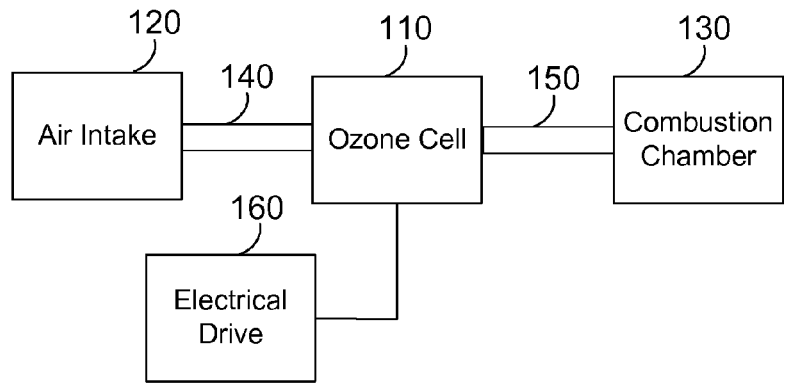
FIG. 1 is a block diagram of an apparatus in accordance with the prior art for providing ozone to a combustion chamber.
Figure 2:
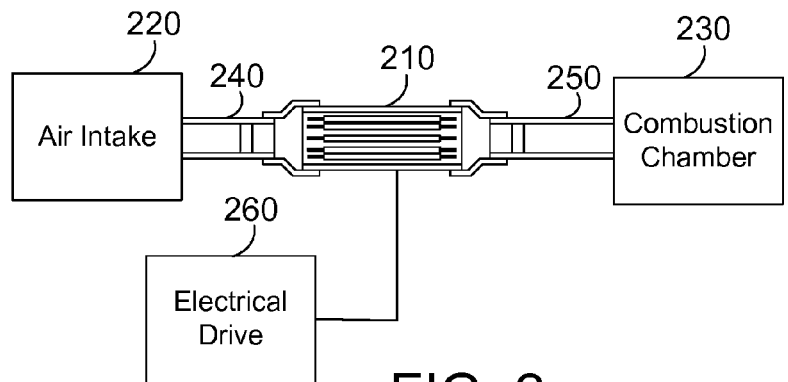
FIG. 2 is system view of an apparatus for providing ozone to a combustion chamber.

FIG. 2 shows an ozone cell 210 used to enhance the efficiency of combustion as described herein. In FIG. 2, an ozone cell 210 is suitably disposed between an air intake 220 and a combustion chamber 230 to produce ozone and induce a charge in the air supply of a combustion process. Alternatively, the ozone cell is incorporated into the air intake pipe of an exiting engine setup. The combustion process may be an internal combustion engine such as a diesel truck engine or a gasoline combustion engine such as used in automobiles. Alternatively, the combustion processes could also be combustion processes such as those used for electric power generation, furnaces, water heaters, or virtually any other combustion process.

Again referring to FIG. 2, the ozone cell 210 is connected in the supply line 240 from the air intake 220 and connected to the combustion chamber 230 with a supply line 250. The ozone cell can be mounted in any suitable configuration and could be located at a convenient position which allows the gaseous output to be transmitted to the combustion chamber 230 by a supply line 250. The ozone cell 210 is energized by an electrical drive circuit 260, which is described further below with reference to FIG. 12.

Figure 3:
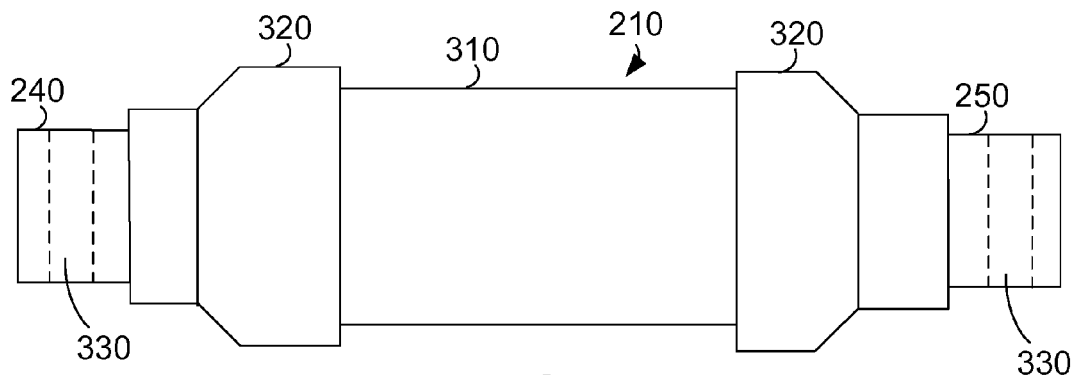
FIG. 3 is the ozone cell 210 shown in FIG. 2 for providing ozone to a combustion chamber.

FIG. 3 shows an external view of the ozone cell 210. In this implementation, the ozone cell 210 includes a central housing 310 that may comprise a 4 inch pipe of PVC or similar material. The central housing 310 and the supply line 250 must be capable of carrying ozone gas and charged air without excessive deterioration. For example, PVC, neoprene or other inert material could be used. The central housing 310 is preferably larger in diameter than the supply lines 240, 250 so that the addition of cell elements (not shown in FIG. 3 and described below) will not significantly restrict air flow through the ozone cell 210. In this implementation, the central housing is connected to supply lines 240, 250 with 4 inch to 3 inch couplings 320. FIG. 3 further illustrates the location of a scrubber vortex 330 disposed in each of supply lines 240 and 250. Further detail of the scrubber vortex is shown in FIG. 5 and described in the related text below.

Figure 4:
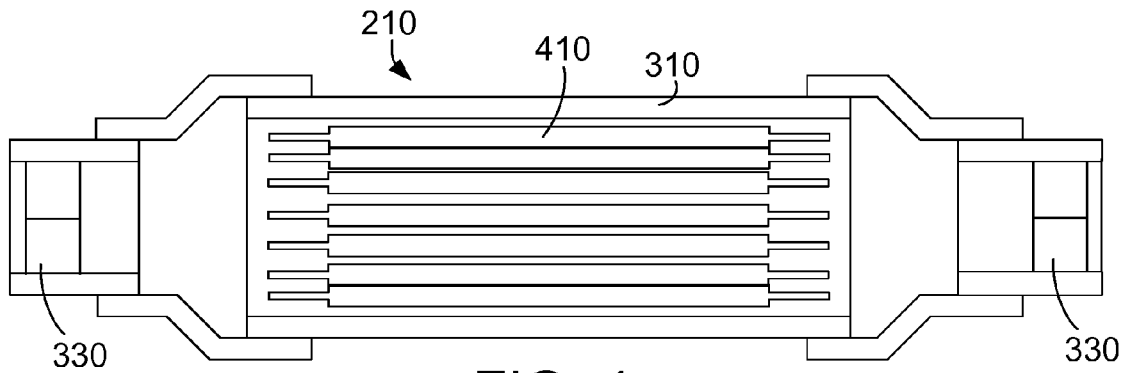
FIG. 4 is a cross-sectional view of the ozone cell in FIGS. 2 and 3 for providing ozone to a combustion chamber.

FIG. 4 shows a cross-sectional view of the ozone cell 210. In one specific configuration, the ozone cell 210 includes an arrangement of multiple ozone elements 410 within the housing. The arrangement of the ozone elements within the housing is described further below in conjunction with FIG. 8 and FIG. 11. The ozone elements are cylindrical in shape and run nearly the length of the housing. The overall length of the ozone elements can vary depending on the application. The ozone cell 210 has one or more scrubber vortexes 330 that provide air turbulence as described further below.

Figure 5:
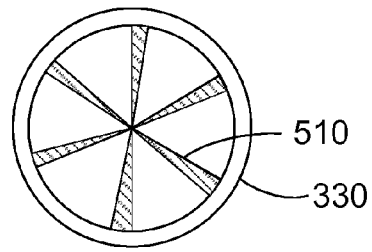
FIG. 5 is a scrubber vortex apparatus.

FIG. 5 illustrates the scrubber vortex 330 as viewed from the end of the ozone cell 210. The scrubber vortex 330 may comprise six fins 510 equally spaced in the supply lines 240, 250. The fins 510 are bent to have a propeller like shape to disturb the air flow and cause the air to have turbulence. The vortex scrubber may comprise two sets of fins radially disposed from the center of the housing to the inner edges of the housing. The first set of fins is in the intake supply line 240 and the second set of fins is in the output supply line 250. Alternatively, the two sets of fins of the vortex scrubber may be on either end of the housing 210. The turbulent air flow was found to increase the available ozone exiting the ozone cell 210. The air turbulence increases the exchange of fresh air at the surface of the ozone cell with the ozone containing air. It appears the increased ozone production is due to increased air being exposed to the ozone cell's plasma field.

Figure 6:
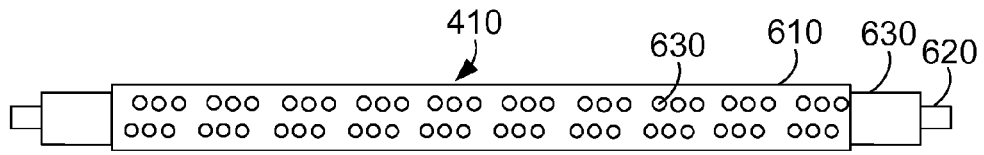
FIG. 6 is an ozone element.
Figure 7:
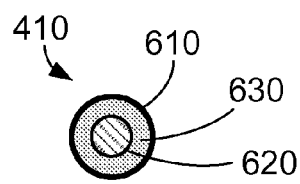
FIG. 7 is an end view of the ozone element shown in FIG. 6.

Referring now to FIGS. 6 and 7, additional details of ozone element 410 will be described. The ozone element primarily comprises two conductive electrodes separated by an insulator. In the implementation shown in FIG. 6 and FIG. 7, an outer electrode 610 is separated from an inner electrode 620 by insulator 630. The insulator 630 extends beyond the outer electrode a distance sufficient to insure the voltage potential on the electrodes does not cause an arc between the electrodes. The insulator 630 may extend about one and one-half inches past the outer electrode 610 on the surface of the inner electrode 620, as shown in FIG. 6.

Again referring to FIG. 6, insulator 630 is visible through a pattern of openings in the outer electrode 610. The openings in the outer electrode 610 provide air turbulence at the electrode surface to provide additional air contact with the electrode surface to increase the production of ozone and therefore the amount of ozone available to the combustion chamber. The inner electrode and the outer electrode can be made of variety of materials as is known in the prior art. The electrodes are preferably made of stainless steel, but can also be formed from a variety of materials. In the illustrated implementation, the insulator is made of a non-conductive ceramic material.

Figure 8:
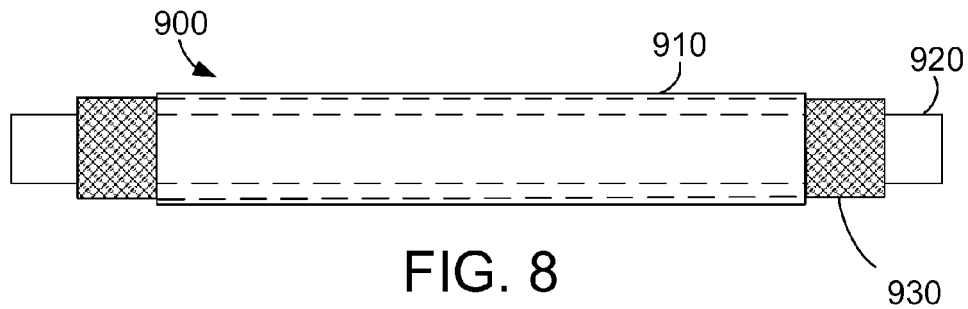
FIG. 8 is a lateral cross section view of another ozone element.
Figure 9:
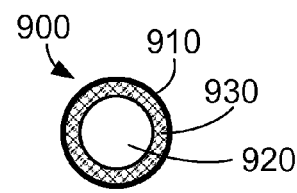
FIG. 9 is an end view of the ozone element shown in FIG. 8.

FIGS. 8 and 9 illustrate an ozone element 900 according to another implementation. The ozone element similarly comprises two conductive electrodes separated by an insulator. In this example implementation, an outer electrode 910 is separated from an inner electrode 920 by insulator 930. In contrast to the previous implementation, in this implementation the inner electrode 920 is hollow or made of a open pipe as illustrated in FIG. 9. The open inner electrode 920 allows increased air flow through the ozone cell 210 (FIG. 2) and increased air flow in and around the ozone element 910 to increase the production of ozone by the ozone cell 210. In this implementation, the outer electrode and inner electrode are preferably made of 5/8 inch and 1/2 inch pipe respectively. Further, in this example, the inner electrode is made of a stainless steel pipe coated in polypropylene that is inserted in a second stainless steel pipe. Other insulators could also be used such as polyethylene, PVC or other insulators as used in the prior art.

Figure 10:
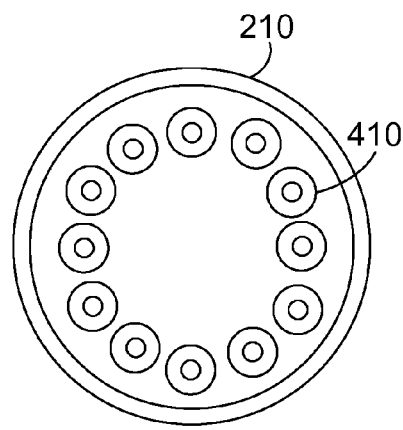
FIG. 10 is a cross-sectional view of an ozone cell.

FIG. 10 illustrates a cross-sectional view of an ozone cell 210. This example has multiple ozone elements 410 arranged in a concentric circle pattern inside the ozone cell 210. The number of ozone elements can vary depending on the specific application and the size of the ozone cell housing. The pattern of ozone elements allows for the formation of a plasma field around each of the ozone elements and between the ozone elements.

Figure 11:
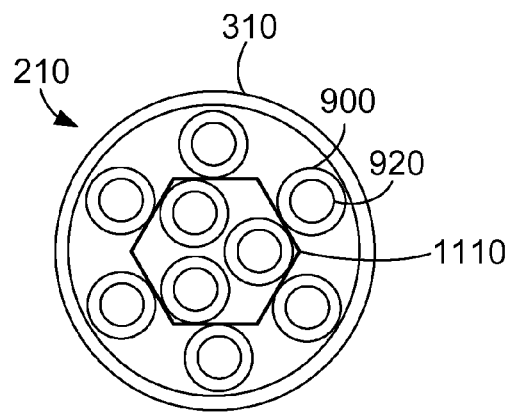
FIG. 11 is an end view of another ozone cell.

FIG. 11 illustrates an end view of an open ozone cell 210 with a different pattern of ozone elements. This example also has multiple ozone elements 900 arranged in a concentric circle pattern inside the ozone cell housing 310. In addition to the concentric pattern, the ozone elements are placed tangent to a bonding spacer 1110 that is formed in the shape of a polygon such as a hexagon. The bonding spacer 1110 is preferably formed of a sheet of metal formed into a polygon. The bonding spacer 1110 is used to attached the ozone elements together in a spaced arrangement inside the ozone cell 310. The bonding spacer is also used to provide an electrical connection to all the ozone elements as described below with reference to FIG. 12. Further, in this implementation, another set of ozone elements are placed within the concentric circle of the first set of elements, and within the polygon. The number of ozone elements can vary depending on the specific application and the size of the ozone cell housing and the polygon used for the bonding spacer 1110. This dual pattern of ozone elements allows for the formation of a plasma field around each of the ozone elements and between the ozone elements, and allows for additional ozone elements to be placed within a specific diameter of ozone cell housing 310. The ozone cell 210 is shown with the ozone elements 900 described with reference to FIGS. 8 and 9 where the ozone elements 900 have an open center electrode to increase the amount of air flow through the ozone cell 210.

Figure 12:
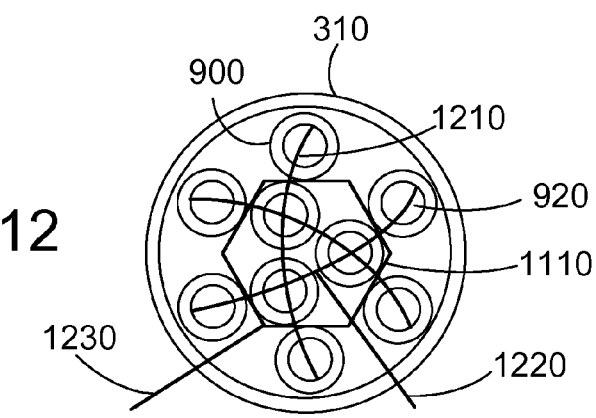
FIG. 12 is an end view of an ozone cell with electrical connections.

FIG. 12 illustrates electrical connections that are made inside the ozone cell 310 to the ozone elements 900. As introduced above, the bonding spacer 1110 provides an electrical connection to all the ozone elements. Each of the ozone element's outer electrode is welded or otherwise electrically connected to the bonding spacer 1110. An electrical connection 1230 penetrates through the housing 310 and connects to the ozone spacer 1110. The electrical circuit 250 provides the drive voltage to the ozone element's outer electrode using the electrical connection 1230.

Figure 13:
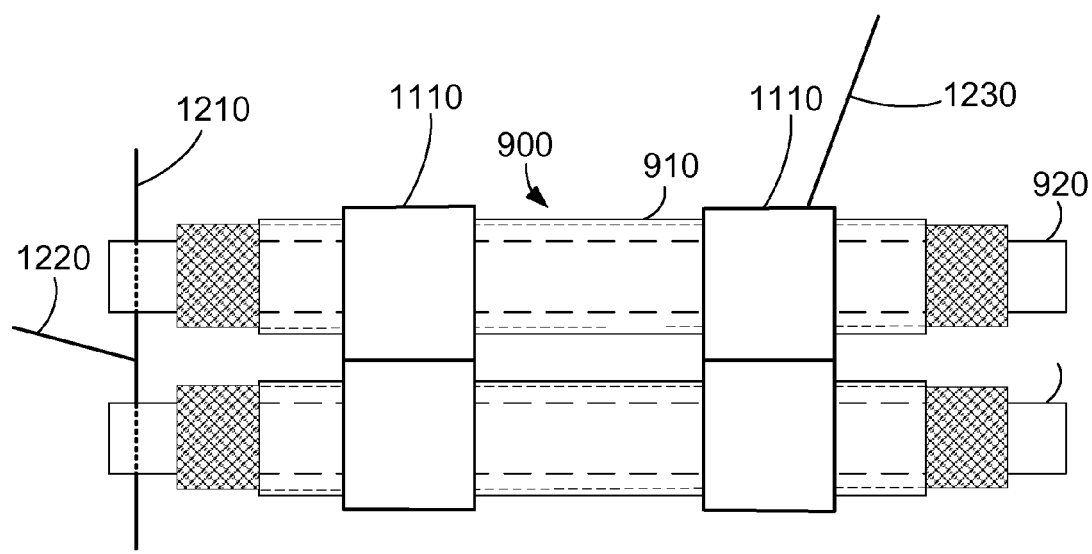
FIG. 13 is a view of two ozone elements that shows the electrical connections to the ozone elements.

FIGS. 12 and 13 further illustrate an electrical connection to the inner electrodes 920 of the ozone elements 900. In the illustrated implementation, electrical connections to the inner electrodes 920 of each of the ozone elements 900 is accomplished by a set of interconnecting wires or rods 1210 that are connected in a suitable pattern. In this implementation, the arc shaped wire 1210 penetrates four adjacent ozone elements. Each of the arc shaped wires 1210 are preferably connected at the intersection points so that a single connection wire 1220 can connect all the inner electrodes 920 to the electrical circuit 250. The location of the connection wire passing through the cell housing 310 is sealed to preserve the integrity of the cell housing 310. Combining the electrical connections in this manner helps reduce the amount of wiring inside the ozone cell 210 and provides a single connection outside the ozone cell 210 for each of the sets of inner and outer electrodes on the ozone elements 900.

FIG. 13 illustrates further detail of the electrical connections to the ozone elements 900. FIG. 13 is a side view of two ozone elements 900. Electrical connection 1220 is shown to connect to arc shaped wire 1210. The arc shaped wire passes through the extended end of the inner electrode 920 and makes an electrical contact with the inner electrode. The electrical connection 1230 that connects the electrical circuit to the outer electrodes 910 of the ozone elements 900 is also shown. The electrical connection 1230 connects to the bonding spacer 1110 that connects to the outer electrode 910 of each ozone element 900. In this example, there are two bonding spacers 1110, one at each end of the ozone element. Of course, a single bonding spacer could also be used.

Figure 14:
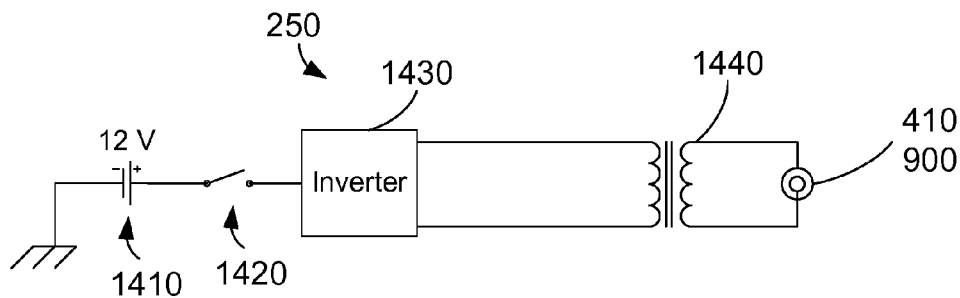
FIG. 14 is a schematic diagram of an electrical drive circuit.

FIG. 14 shows further details of the electrical drive circuit 250 introduced in the discussion of FIG. 2. The electrical drive circuit 250 for the ozone cells includes a battery such as a standard rechargeable twelve volt lead-acid battery of the type usually associated with internal combustion engines. In automotive applications the battery can be the same as the one equipped on the vehicle since the current draw of the drive circuit 250 is minimal. The current from the battery 1410 is connected through a switch 1420 to an inverter 1430 which converts the electrical output of the battery 1410 to an AC voltage, at approximately 60 hertz. The output of the inverter 1430 is connected to a transformer 1440. A suitable transformer for use in connection with the present invention is described further below. Preferably, the transformer 1440 boosts the voltage to approximately 7,000-8,500 VAC. The secondary winding of the transformer 1440 is connected to the ozone elements 410, 900 as described above.

Figure 15:
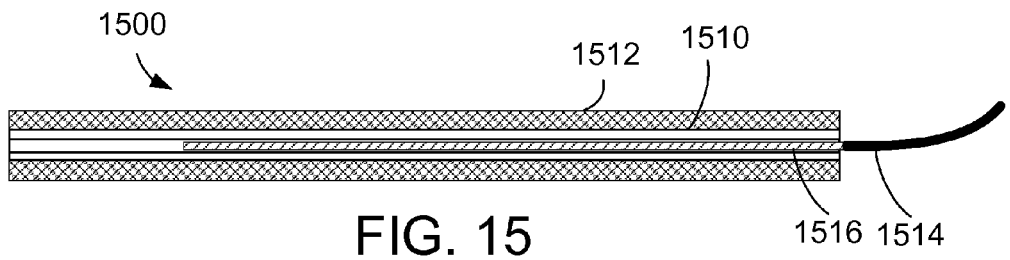
FIG. 15 is an cross-sectional side view of another example of an ozone element.
Figure 16:
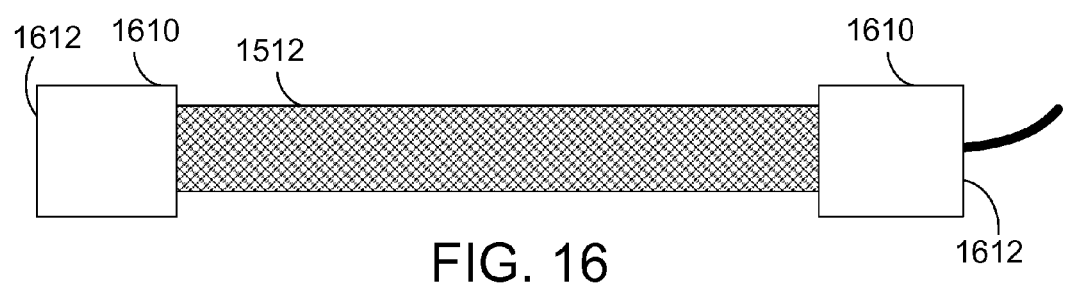
FIG. 16 is a front view of the ozone element shown in FIG. 15 with added insulation caps.
Figure 17:
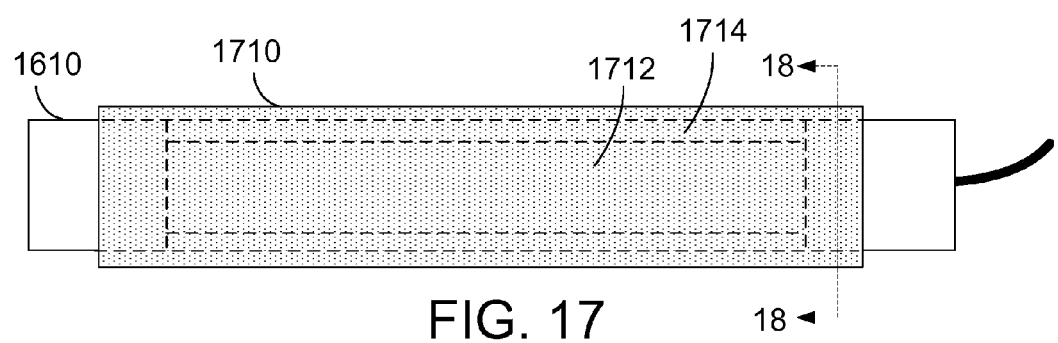
FIG. 17 is a front view of the ozone element shown in FIG. 16 with an outer electrode.

FIGS. 15 through 17 illustrate a layer by layer build-up of an ozone element 1500. FIG. 15 illustrates a cross-sectional view of a cylindrically shaped inner electrode 1510 surrounded by a cylindrically shaped insulator 1512. Similar to the previous example implementation, the inner electrode 1510 is hollow or made of an open pipe as illustrated in FIG. 15. The inner electrode 1510 accepts an electrical conductor 1514 that is inserted into the center of the electrode 1510. The end 1516 of the electrical conductor extending into the inner electrode 1510 is un-insulated, while the remaining portion of the electrical conductor may be insulated. The electrical conductor 1514 is electrically and mechanically connected to the inner electrode 1510 in a suitable manner, such as soldering or crimping the inner electrode. As shown in FIG. 15, the electrical conductor 1514 may extend substantially through the electrode 1512, but may extend a lesser amount. The inner electrode is preferably made of stainless steel pipe that is inserted in the insulator 1512. The insulator is preferably a ceramic material such as glazed or unglazed porcelain. Other insulators could also be used such as polyethylene, PVC or other insulators as used in the prior art.

FIG. 16 illustrates a front view of the ozone element 1500 introduced in FIG. 15. FIG. 16 illustrates the addition of insulator caps 1610 over the insulator 1512. The insulator caps 1610 are disposed at the ends of the ozone element 1500. The insulator caps cover a portion of each end of the ozone element and may extend beyond the end of the ozone element. The insulator caps 1610 provide several functions. First, they prevent arching between the inner electrode 1510 and the outer electrode (described below) at the ends of the ozone elements. Second, the insulator caps provide a structural element between the insulator 1512 and outer electrode. And third, the insulator caps seal the ends of the outer electrode to prevent axial air flow between the outer electrode and the insulator 1512. The ends 1612 of the insulator caps 1610 are sealed to cover the ozone element 1600. The ends may be sealed in a suitable manner such as using a dielectric compound to file the insulator caps, using a cup shaped insulator cap, or by using shrinkable tubing for the insulator caps.

FIG. 17 illustrates a front view of the ozone element 1500 introduced in FIG. 16 with the addition of a cylindrically shaped outer electrode 1710. The outer electrode 1710 fits over the insulator caps 1610 and may be held in place by a tight fit of the outer electrode pressed over the insulator caps 1610. The outer electrode 1710 is a conductive metal, and in this example is stainless steel. Further, the outer electrode may be perforated with a pattern of openings 1712 through the outer electrode. The openings provide an open space on the surface of the outer electrode of about 50%. The openings in the outer electrode expose a cavity or space 1714 between the outer electrode and the insulator 1512 that is created by thickness of the insulator caps 1610 that provide spacing between the insulator and the outer electrode. While the space 1714 allows air to circulate between the outer electrode and the insulator, air does not flow axially through the space where the ends of the ozone element are sealed by the insulator caps 1610. Air movement in the space 1714 is a turbulent air flow through the openings 1712 in the outer electrode 1710 meaning only that air that enters through the opening 1710 exits through the openings 1710.

Figure 18:
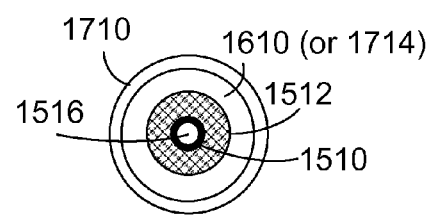
FIG. 18 is a cross-sectional end view of the ozone cell shown in FIG. 17.

FIG. 18 illustrates a cross-sectional end view of an ozone element 1500 shown in FIG. 17 taken along the line 18-18. The ozone element 1500 includes the exposed end 1516 of an electrical conductor 1516 connected to an inner electrode 1510. The inner electrode 1510 is surrounded by an insulator 1512. The insulator 1512 is surrounded on the ends by insulator caps 1610. Alternatively, if the cross section for this Figure were to be taken in the middle section, then the insulator 1510 would be surrounded by space 1714. The insulator caps 1610 (or space 1714) are surrounded by the outer electrode 1710. The inner electrode 1510 preferably has an outer diameter of about 0.148 inches to provide a close fit to slide the inner electrode 1510 inside the insulator 1512 that has an inner diameter of about 0.156 inches. The insulator 1512 is preferably a porcelain tube with an outer diameter of 0.250 giving the insulator 1512 a wall thickness of about 0.047 inches. The outer electrode 1710 is preferably has an inner diameter of about 0.375 inches and an outer diameter of about 0.437 inches. This makes the space 1714 about 0.0625 inches that is provided by the thickness of the insulator caps 1610 as described above.

Figure 19:
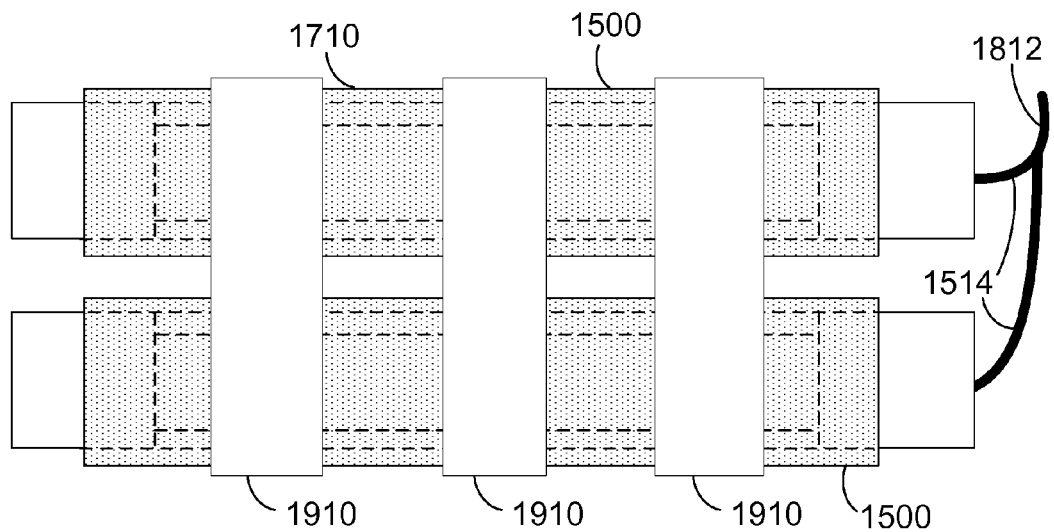
FIG. 19 is a view of two ozone elements that shows electrical bonding spacers that connect the ozone elements.

FIG. 19 illustrates a front view of two ozone elements 1500 described above with reference to FIGS. 15 through 18. FIG. 19 shows that the electrical conductors 1516 connected to the ozone elements 1500 can be combined together to make an electrical connection 1812 to the electrical circuit described above. The electrical connection 1514 may be made inside the housing or outside the housing (not shown). FIG. 19 further shows bonding spacers 1910 that electrically and mechanically connect the ozone elements 1500. In FIG. 19, the bonding spacers 1910 are shown to connect two ozone elements 1500. In a similar manner, the bonding spacers may connect a number ozone elements arranged in an ozone cell as described herein. The bonding spacers are preferably constructed of an electrically conductive metal that is welded, soldered or brazed to the outer electrodes 1710 of the ozone elements 1500. An electrical connection to the bonding spacer and to the outer electrodes may then be accomplished as described below with reference to FIG. 20. In this example, there are three bonding spacers 1910 spaced along the ozone elements 1500.

Figure 20:
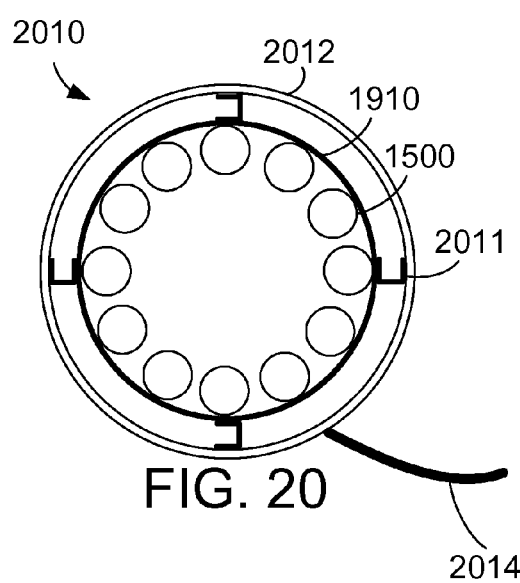
FIG. 20 is an end view of an open ozone cell having ozone elements as described in FIGS. 15 through 18.

FIG. 20 illustrates an end view of an open ozone cell 2010 having ozone elements 1500 as described in FIGS. 15 through 18. The ozone cell 2010 has multiple ozone elements 1500 arranged in a concentric circle pattern inside the ozone cell housing 2012. In addition to the concentric pattern, the ozone elements are placed tangent to the bonding spacers 1910 that are formed in the shape of a circle. The bonding spacers 1910 suspend the ozone elements 1500 within the ozone cell 2010. The bonding spacer 1910 is preferably formed of a sheet of metal formed into a circular shape. The bonding spacers 1910 are used to attached the ozone elements together in a spaced arrangement inside the ozone cell 310. The bonding spacers 1910 are further connected by tab connectors 2011 to the ozone cell housing 2012. In this example, the ozone cell housing 2012 is a conductive metal housing and the tab connectors 2011 provide electrical connection between the ozone elements 1500 and the ozone cell housing 2012. The ozone cell housing 2012 corresponds to the central housing 310 described in the examples above. The ozone cell housing 2012 is then connected to the electrical circuit described with reference to FIG. 14 through an electrical connection 2014. The electrical connection 2014 may be through a chassis ground connection where the ozone cell housing is directly connected to chassis ground (now shown) instead of through a wire as shown.

It is important to note that the ozone elements described herein have limited or no space for air to flow directly between the electrodes. Prior art ozone generator cells typically relied on significant air flow between the electrodes. This prior art method could be used in conjunction with the described ozone cells herein. However, tests have shown a significant increase in ozone production over prior art designs using the illustrated electrode configurations.

Tests by the inventor herein indicate that a reduced temperature of the ozone cell increases the amount of ozone available to the combustion chamber. Tests indicated that a low frequency in combination with a lower voltage keeps the ozone elements within only a few degrees above ambient air temperature which produces a productive corona or plasma field for increased ozone available to the combustion chamber compared to prior art ozone generator cells. Preferably the increase in the air temperature is less than 10 degrees, and in most preferably, the increase in the air temperature is less than 5 degrees. The voltage is preferably from about 6,000 volts to about 12,000 volts AC. The most preferred is a voltage of about 7,000-8,500 volts AC. The preferred frequency is about 60 to 1000 Hz, with the most preferred frequency about 60 Hz.

Preferably, the transformer is an oil filled, iron core transformer with copper wrap coils, that has the following electrical characteristics:

Input: 120 vac/60 hz
output: 7-8.5 kvac/27 ma
Max Pri Va 260
Max Pri Watts 125
Open Sec KvRMS 7-8.5
Short Sec Ma 27

The disclosure and claims herein are directed to an apparatus that provides significant improvements over the prior art. An apparatus and method was described that increases combustion efficiency and performance and lowers emissions of virtually any combustion process. An ozone cell as described herein provides improved efficiency and performance and lower emissions in an internal combustion engine such as a diesel truck engine.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

What is claimed is:

1. An apparatus for increasing the efficiency of combustion comprising:

a housing disposed between an air intake and a combustion chamber to supply air to the combustion chamber;

a plurality of adjacent cylindrical ozone elements arranged in the housing for creating a plasma field in the housing around and between the ozone elements;
wherein the ozone elements each comprise:
  a cylindrically shaped outer electrode of conductive material perforated with a pattern of holes;
  a cylindrically shaped inner electrode of conductive material disposed inside the outer electrode;
  a cylindrically shaped insulator between the inner and outer electrodes; and
  two insulating end caps between the insulator and outer electrodes that cover both ends of the inner electrode and the insulator and form a space between the inner and outer electrode between the two insulating end caps.

2. The apparatus of claim 1 further comprising an electrical circuit that applies a low frequency AC drive voltage to the ozone elements to provide a low temperature plasma field that does not substantially increase the ambient air temperature wherein the low frequency AC drive voltage is about 7,000-8,500 volts AC and the increase in the ambient air temperature is less than 5 degrees F.

3. The apparatus of claim 1 further comprising an electrically conducting bonding spacer that mechanically and electrically connects the ozone elements in a concentric circle inside the housing.

4. The apparatus of claim 1 wherein the combustion chamber is the cylinder of a combustion engine.

5. The apparatus of claim 1 wherein the combustion chamber is the cylinder of a diesel engine.

6. The apparatus of claim 1 further comprising a vortex scrubber in the housing to produce a vortex motion of air moving through the housing.

7. The apparatus of claim 6 wherein the vortex scrubber in the housing comprises two sets of fins radially disposed from the center of the housing to the inner edges of the housing, wherein the first set of fins is in the intake of the housing and the second set of fins is in the output of the housing.

8. The apparatus of claim 1 wherein the inner electrode and the outer electrode form an anode and cathode, respectively made of stainless steel.

9. The apparatus of claim 1 wherein the insulator is made of a porcelain material.

10. The apparatus of claim 1 wherein the housing comprises a conductive metal pipe.

11. An apparatus for increasing the efficiency of a combustion engine comprising:
  a housing disposed between an air intake and a combustion chamber to supply air to the combustion chamber;
  a plurality of adjacent cylindrical ozone elements arranged in the housing for creating a plasma field in the housing around and between the ozone elements;
  wherein the ozone elements each comprise:
    a cylindrically shaped outer electrode of conductive material perforated with a pattern of holes;
    a cylindrically shaped inner electrode of conductive material disposed inside the outer electrode;
    a cylindrically shaped porcelain insulator between the inner and outer electrodes;
    two insulating end caps between the insulator and outer electrodes that cover both ends of the inner electrode and the insulator and form a space between the inner and outer electrode between the two insulating end caps; and
  an electrical circuit that applies a low frequency AC drive voltage of about 7,000-8,500 volts to the ozone elements to provide a low temperature plasma field that does not substantially increase the ambient air temperature.

12. The apparatus of claim 11 wherein the insulating caps seal over the ends of the inner electrode and the insulator.

13. The apparatus of claim 11 wherein the increase in the ambient air temperature is less than 5 degrees F.

14. The apparatus of claim 11 wherein the ozone elements are arranged in a concentric circle inside the housing.

15. The apparatus of claim 11 further comprising a vortex scrubber in the housing to produce a vortex motion of air moving through the housing.

16. An apparatus for increasing the efficiency of a combustion engine comprising:
  a conductive metal housing disposed before a combustion chamber to supply air to the combustion chamber, wherein the housing comprises the air intake of a combustion engine;
  a plurality of adjacent cylindrical ozone elements arranged inside the housing for creating a plasma field in the housing around and between the ozone elements;
  wherein the ozone elements each comprise:
    a cylindrically shaped outer electrode of conductive material perforated with a pattern of holes;
    a cylindrically shaped inner electrode of conductive material disposed inside the outer electrode;
    a cylindrically shaped porcelain insulator between the inner and outer electrodes;
    two insulating end caps between the insulator and outer electrodes that cover both ends of the inner electrode and the insulator and form a space between the inner and outer electrode between the two insulating end caps and wherein the insulating caps seal over the ends of the inner electrode and the insulator; and
  an electrically conducting bonding spacer that mechanically and electrically connects the ozone elements.

17. The apparatus of claim 16 wherein the bonding spacer arranges the ozone elements in a concentric circle inside the housing.

18. The apparatus of claim 16 wherein a drive voltage is about 7,000-8,500 volts AC.

19. The apparatus of claim 16 wherein a low temperature plasma field increases the ambient air temperature no more than 10 degrees.

20. The apparatus of claim 16 further comprising a vortex scrubber in the housing to produce a vortex motion of air moving through the housing.

* * * * *